(12) United States Patent
Bodley et al.

(10) Patent No.: US 11,119,960 B2
(45) Date of Patent: Sep. 14, 2021

(54) ADAPTER TO CONCATENATE CONNECTORS

(71) Applicant: Hewlett-Packard Development Company, L.P., Houston, TX (US)

(72) Inventors: Andrew David Bodley, Fort Collins, CO (US); Byron A. Alcorn, Fort Collins, CO (US); Shane Ward, Windsor, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 582 days.

(21) Appl. No.: 15/521,760

(22) PCT Filed: Jan. 6, 2015

(86) PCT No.: PCT/US2015/010229
§ 371 (c)(1),
(2) Date: Apr. 25, 2017

(87) PCT Pub. No.: WO2016/111677
PCT Pub. Date: Jul. 14, 2016

(65) Prior Publication Data
US 2017/0249269 A1  Aug. 31, 2017

(51) Int. Cl.
*G06F 13/42* (2006.01)
*G06F 13/38* (2006.01)
(Continued)

(52) U.S. Cl.
CPC .............. *G06F 13/385* (2013.01); *G06F 3/00* (2013.01); *G06F 12/02* (2013.01); *G06F 13/42* (2013.01); *H01J 1/16* (2013.01); *H04L 12/66* (2013.01)

(58) Field of Classification Search
CPC .......................... H04L 47/10; H04L 41/0896
(Continued)

(56) References Cited

U.S. PATENT DOCUMENTS 7,421,520 B2   9/2008  Wilkins et al.
2006/0165116 A1  7/2006  Bayus et al.
(Continued)

FOREIGN PATENT DOCUMENTS

CN   1777177     5/2006
CN   101983365   3/2011
(Continued)

OTHER PUBLICATIONS

Bhanu Prakash Reddy Tholeti, Chapter 16: Hypervisors, Virtualization, and Networking, 392-93, in Handbook of Fiber Optic Data Communications, available at https://www.sciencedirect.com/topics/computer-science/link-aggregation (Casimer DeCusatis ed., 4th ed. 2014).*

(Continued)

*Primary Examiner* — Titus Wong
(74) *Attorney, Agent, or Firm* — Fabian VanCott

(57) ABSTRACT

Examples disclosed herein involve a first connector that facilitates access to a system, a second connector that facilitates access to the same system, and an adapter controller to facilitate concatenating functionality of the first connector and the second connector when the apparatus is communicatively coupled to the system via the first connector and the second connector; and establish a high speed connection between the system and the apparatus via the first connector and the second connector.

20 Claims, 7 Drawing Sheets

(51) Int. Cl.
*G06F 3/00* (2006.01)
*G06F 12/02* (2006.01)
*H01J 1/16* (2006.01)
*H04L 12/66* (2006.01)

(58) Field of Classification Search
USPC ........................................................ 710/105
See application file for complete search history.

(56) References Cited

U.S. PATENT DOCUMENTS

| | | | | |
|---|---|---|---|---|
| 2008/0201756 | A1* | 8/2008 | Shakiba | H04L 25/0264 725/119 |
| 2011/0145468 | A1* | 6/2011 | Diard | G06F 13/20 710/313 |
| 2011/0171903 | A1 | 7/2011 | Toebes | |
| 2012/0077384 | A1* | 3/2012 | Bar-Niv | H01R 27/00 439/625 |
| 2012/0191894 | A1* | 7/2012 | Sasaki | G06F 13/387 710/313 |
| 2013/0080684 | A1 | 3/2013 | Ha et al. | |
| 2013/0138861 | A1 | 5/2013 | Terlizzi et al. | |
| 2013/0332642 | A1* | 12/2013 | Capezza | G06F 13/4081 710/304 |
| 2013/0335430 | A1* | 12/2013 | Douglas | G09G 5/006 345/520 |
| 2014/0003451 | A1 | 1/2014 | Wagh et al. | |

FOREIGN PATENT DOCUMENTS

| | | |
|---|---|---|
| CN | 102299532 | 12/2011 |
| CN | 202997194 U | 6/2013 |
| CN | 103327656 A | 9/2013 |
| CN | 203386934 U | 1/2014 |
| CN | 203387024 U | 1/2014 |
| TW | 201407362 A | 2/2014 |

OTHER PUBLICATIONS

Ryan, Christopher. "SanDisk A110 PCIe SSD: Armed With the New M.2 Edge Connector," Tom's Hardware: The Authority on Tech, Sep. 5, 2013, pp. 1-26.

* cited by examiner

ADAPTER TO CONCATENATE CONNECTORS

CROSS-REFERENCE TO RELATED APPLICATION

This application is a U.S. National Stage Application of and claims priority to International Patent Application No. PCT/US2015/010229, filed on Jan. 6, 2015, and entitled "ADAPTER TO CONCATENATE CONNECTORS."

BACKGROUND

Users may connect peripheral devices (e.g., storage devices, input/output (I/O) devices, printers, digital cameras, wireless antennas, etc.) to computing systems to expand the functionality of the computing system or facilitate interaction with the peripheral devices. There are a variety of connection interfaces and protocols that may be used to establish a connection between a peripheral device and a computing device. Example connections/connectors include universal serial bus (USB), display port, serial port, M.2 (Next generation form factor (NGFF)), peripheral component interconnect (PCI), peripheral component interconnect express (PCIe), Thunderbolt™, Lightning™, etc.

Figure 1:
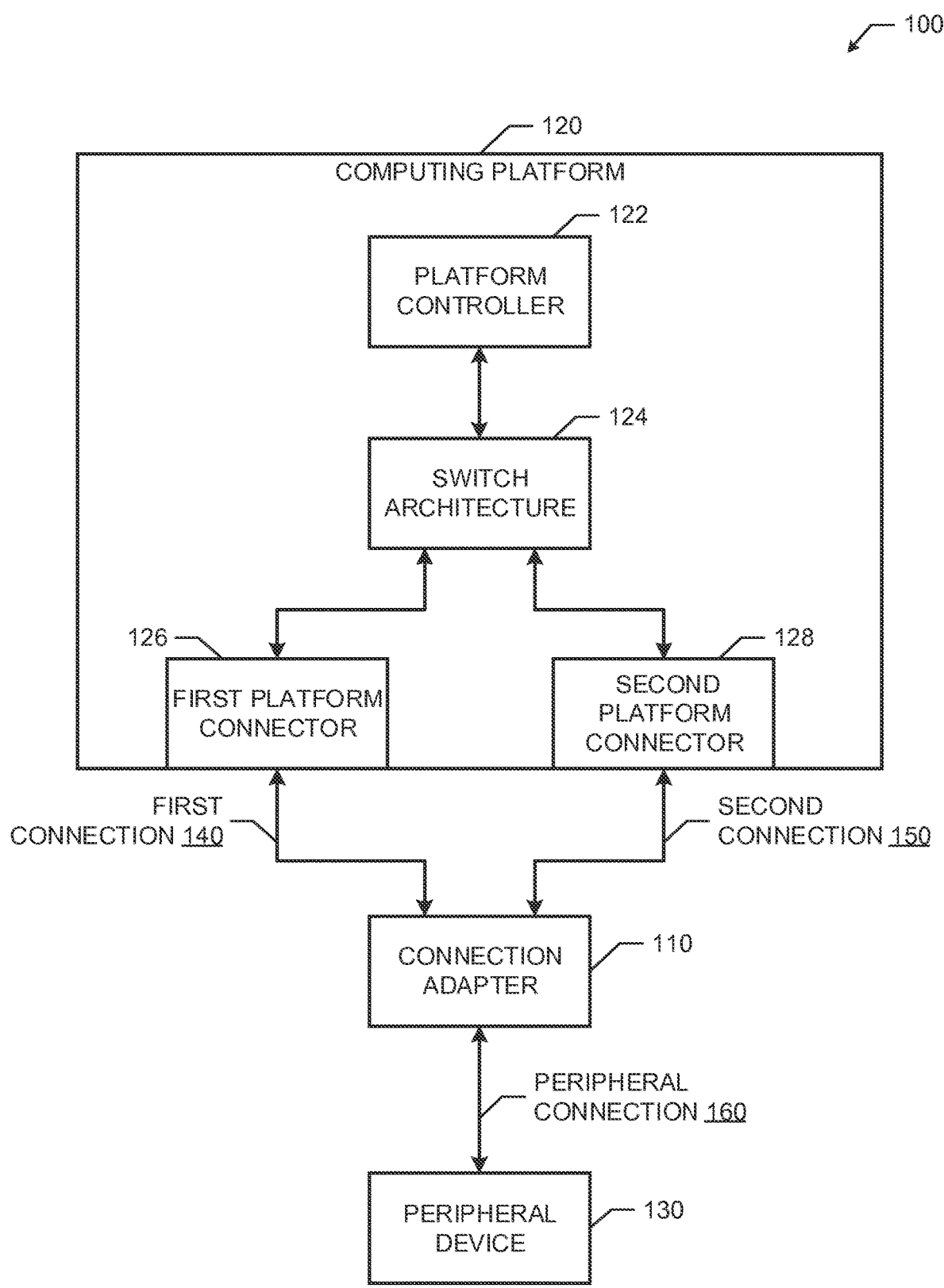
FIG. 1 is a schematic diagram of an example peripheral connection system including a connection adapter that may be implemented in accordance with an aspect of this disclosure.

Wherever possible, the same or similar reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with at least one intermediate part located therebetween. Stating that any part is in contact with another part means that there is no intermediate part between the two parts. As used in this patent, stating that any device is connected to another device means that the devices are communicatively coupled with one another, for example, through a wired connection or wired communication link.

DETAILED DESCRIPTION

Examples disclosed herein involve an adapter to concatenate resources or functionality of connectors of a system. An example connection adapter involved herein may be connected to a computing device (e.g., a computer, a server, a mobile device, etc.) via a plurality of connectors (e.g., two, three, four, etc.) and a peripheral device. The example connection adapter, in accordance with aspects of this disclosure, facilitates establishing a high speed connection or communication link between the computing device and the peripheral device using the plurality of connectors. As used herein, a communication link or connection may be direct (without intermediate component(s), element(s), or device(s) or indirect (with intermediate component(s), element(s), or device(s)).

Many computing devices include a hardware design that is not flexible. In other words, the types of peripheral devices that can connect to the computing device is defined by the hardware design (e.g., the types of connectors included on the computing device). Accordingly, it may be difficult for users to take advantage of opportunities to expand the capabilities of the computing device because of a number or type of peripheral devices that may be connected to the computing device can be limited (due to the hardware design of the devices). Furthermore, it may not be possible to access the computing device via a high speed connection as individual connectors in the hardware design of the computing device may not have the bandwidth or speed capabilities demanded by certain peripheral devices. Examples disclosed herein disclose a connection adapter to facilitate high speed access to a computing platform for a peripheral device by concatenating resources or functionality of multiple connectors of the computing device. In some examples, the connection adapter may have capabilities of connecting to a plurality of types of peripheral devices (e.g., universal serial bus (USB), serial attached SCSI (SAS) device (where SCSI stands for small computer system interface), serial advanced technology attachment (SATA) device, a Thunderbolt™ device, a Lightning™ device, a flexible wireless device (e.g., wireless display (Wi-Di) device, wireless local area network (WLAN) device, wireless USB device, etc.).

An example apparatus disclosed herein includes a first connector that facilitates access to a system, a second connector that facilitates access to the same system, and an adapter controller to facilitate concatenating functionality of the first connector and the second connector when the apparatus is communicatively coupled to the system via the first connector and the second connector and to establish a high speed connection between the system and the apparatus via the first connector and the second connector. An example method includes identifying a first connection from a connection adapter to a peripheral device; identifying a second connection from the connection adapter to a system platform, the second connection established via a first connector of the system platform and a second connector of the system platform; and instructing the system platform to concatenate resources of the first connector and resources of the second connector such that the concatenated resources provide a high speed connection to the peripheral device via the connection adapter. An example computing platform may concatenate resources of a first connector and a second connector in response to receiving information (e.g., identification information, instructions, etc.) from a connection adapter by adjusting flexible input/output lanes connected to the first connector and the second connector; and establish a high speed communication link using the concatenated resources with a peripheral device via the adapter through the first connector and the second connector.

FIG. 1 is a schematic diagram of an example peripheral connection system 100 including a connection adapter 110 that may be implemented in accordance with an aspect of this disclosure. In the illustrated example of FIG. 1, the connection adapter 110 is connected to a computing platform 120 and a peripheral device 130. In FIG. 1, the connection adapter 110 is connected to the computing platform via a first connection 140 and a second connection 150 in accordance with the teachings of this disclosure. The example first and second connections 140, 150 may be any wired connection to the computing platform via any type of connector of the computing platform. Further, the connection adapter 110 is connected to the peripheral device 130 via the peripheral connection 160. In the illustrated example of FIG. 1, the connection adapter 110 facilitates a high speed connection between the peripheral device 130 and the computing platform 120. Accordingly, the peripheral device 130 may access the computing platform 120 using high speed connection resources provided via the first and second connections 140, 150.

The example computing platform 120 of FIG. 1 may be any type of system or computing device, such as a personal computer (PC), laptop computer, tablet computer, server, etc. In the illustrated example of FIG. 1, the computing platform 120 includes a platform controller 122, a switch architecture 124, a first platform connector 126, and a second platform connector 128. The example platform controller 122 may include any number of processors, controllers, etc. that control the computing platform 120. For example, the platform controller 122 may include a central processing unit (CPU), an I/O hub (e.g., a platform controller hub (PCH)), a graphics controller module (GFX), etc. The platform controller 122 may control any operations of the computing platform (e.g., display, communications, processing, data retrieval, data storage, etc.).

In examples disclosed herein, the platform controller 122 facilitates connection to the connection adapter 110 via the first platform connector 126 and the second platform connector 128. Furthermore, in examples disclosed herein, the platform controller 122 may control the switch architecture 124 to provide adequate resources to the connection adapter 110 or the peripheral device 130 via the first and second platform connectors 126, 128. The example platform controller 130 may control the switch architecture 124 in response to information (e.g. detection signals, identification information indicating a type of device connected to the connectors 126, 128, etc.) received from the connection adapter 110 or the peripheral device 130. In some examples, the switch architecture 124 may be controlled by the connection adapter 110 via general purpose input/output (GPIO) lines or other mechanisms. Accordingly, the example platform controller 122 or connection adapter 110 of FIG. 1 may adjust the switch architecture 124 to enable access to control circuitry (e.g., CPU, PCH, GFX, etc.) of the platform controller 122 to facilitate a high speed connection or increased bandwidth/performance of a communication link established via the first and second platform connectors 126, 128 (e.g., a communication link with the connection adapter 110 or the peripheral device 130). For example, the platform controller 122 may concatenate resources or functionality of the computing platform 120 or the first and second platform connectors 126, 128 to facilitate or establish the high speed connection.

The example switch architecture 124 may include any number of communication buses, multiplexers, demultiplexers, switches, etc. to facilitate communication or connections between the first and second platform connectors 126, 128 and the platform controller 122. In some examples, the computing platform 120 may not include the switch architecture 124, and the platform controller 122 is directly connected to the first and second platform connectors 126, 128. In some examples, the switch architecture 124 includes a plurality of flexible input/output (I/O) lanes. The switch architecture 124 (e.g., the flexible I/O lanes) is adjustable based on a desired amount of resources (e.g., connection speed, bandwidth, etc.) that are to be made available to the first and second platform connectors 126, 128. Accordingly, flexible interconnects (e.g., switches, multiplexers, etc.) may be selected within the switch architecture 124 to facilitate a high speed connection with the connection adapter 110 or the peripheral device 130. The flexible interconnects of the switch architecture 124 may be based on a high speed signal layout of the computing platform 120 in combination with interconnect options between the first and second platform connectors 126, 128. Accordingly, the computing platform 120 may use the high speed signal layout to increase or maximize a number of possible signals or types of signals that may be routed to the first and second platform connectors 126, 128. In examples disclosed herein, a connection or communication link established by a device (e.g., the connection adapter 110 or the peripheral device 130) via both the first and second platform connectors 126, 128 is considered a high speed connection in that the speed or bandwidth available for the connection or communication link is greater than the speed or connection would be via either the first platform connector 126 or the second platform connector 128.

The example first and second platform connectors 126, 128 may be any type of connector to facilitate access to the computing platform 120. For example, the first or the second platform connectors 126, 128 may be a M.2 connector, a USB connector, a PCI connector, a display port, a serial port, etc. In some examples, the first and second connector 126, 128 may be placed at a fixed (e.g., a standard) distance apart from one another on a housing of the computing platform 120. In some examples, the computing platform 120 may include other connectors in addition to or instead of the first and second platform connectors 126, 128.

The example peripheral device 130 may be any type of peripheral device 130 capable of communicating with the connection adapter 110 or accessing the computing platform 120 via the connection adapter 110. For example, the peripheral device 130 may be one or a plurality of SAS device(s), SATA device(s), a Thunderbolt™ device(s), flexible wireless device(s) (e.g., wireless display (Wi-Di) device, wireless local area network (WLAN) device, wireless USB device, etc.), etc. In examples, disclosed herein, the peripheral device 130 may connect to the computing platform 120 via the first and second platform connectors 126, 128 using the connection adapter 110. Accordingly, the peripheral device 130 may establish a high speed connection with the computing platform 120. For example, the platform controller 122 or the connection adapter 110 may adjust the switch architecture 124 or settings of the platform controller 122 to provide a plurality (e.g., five, ten, etc.) of high speed serial lines providing capabilities for a PCI express connection, a SATA connection, a gigabit Ethernet connection, a USB3 connection, etc. with the peripheral device 130. In some examples, once a physical connection is established between the computing platform 120 and the peripheral device 130 via the connection adapter 110, the computing platform 120 may automatically setup communication with the peripheral device 130 or an I/O controller of the connection adapter 110 (e.g., via a basic input/output system (BIOS), via the platform controller 122, via communication or computing standards, etc.).

The example connection adapter 110 of FIG. 1 facilitates a high speed connection between the peripheral device 130 and the computing platform 110. In examples disclosed herein, the connection adapter 110 may send information to the computing platform 120 to facilitate concatenating functionality or resources (e.g., flexible I/O lanes) of the computing platform 120 (e.g., using resources of the switch architecture). As used herein, concatenating is defined to include combining, arranging, or linking a plurality of elements or components (e.g., resources of the computing platform). For example, upon establishing the first and second connections 140, 150 or the peripheral connection 160, the connection adapter 122 may send information (e.g., instructions, identification information indicating a device or connection type, side signals, etc.) to the platform controller 122 via the first connector 126 or the second connector 128 (e.g., via GPIO lines of the first connection 140 and the second connection 150) to facilitate adjusting or concatenating the functionality of the first and second platform connectors 126, 128 (e.g., by adjusting flexible I/O lanes of the switch architecture 124) to facilitate a high speed connection with the peripheral device 130. In some examples, the platform controller 122 or other components of the computing platform 120 (e.g., the BIOS) may establish a communication link using communication and computing standards based on the detected physical connection of the connection adapter 110 and peripheral device 130 to the computing platform 120. The example information sent between the connection adapter 110 and the computing platform 120 may be defined to tell the BIOS a type or kind of connection (or adapting) may be used for connecting to the peripheral device 130. In some examples, a system management bus (SMbus) may be available for the BIOS to integrate the connection adapter 110.

Though illustrated separately in the example of FIG. 1, the example connection adapter 110 and the example peripheral device 130 may be collocated. In other words, the connection adapter 110 of FIG. 1 may be positioned on, with, or within the peripheral device 130 (or vice versa).

Figure 2:
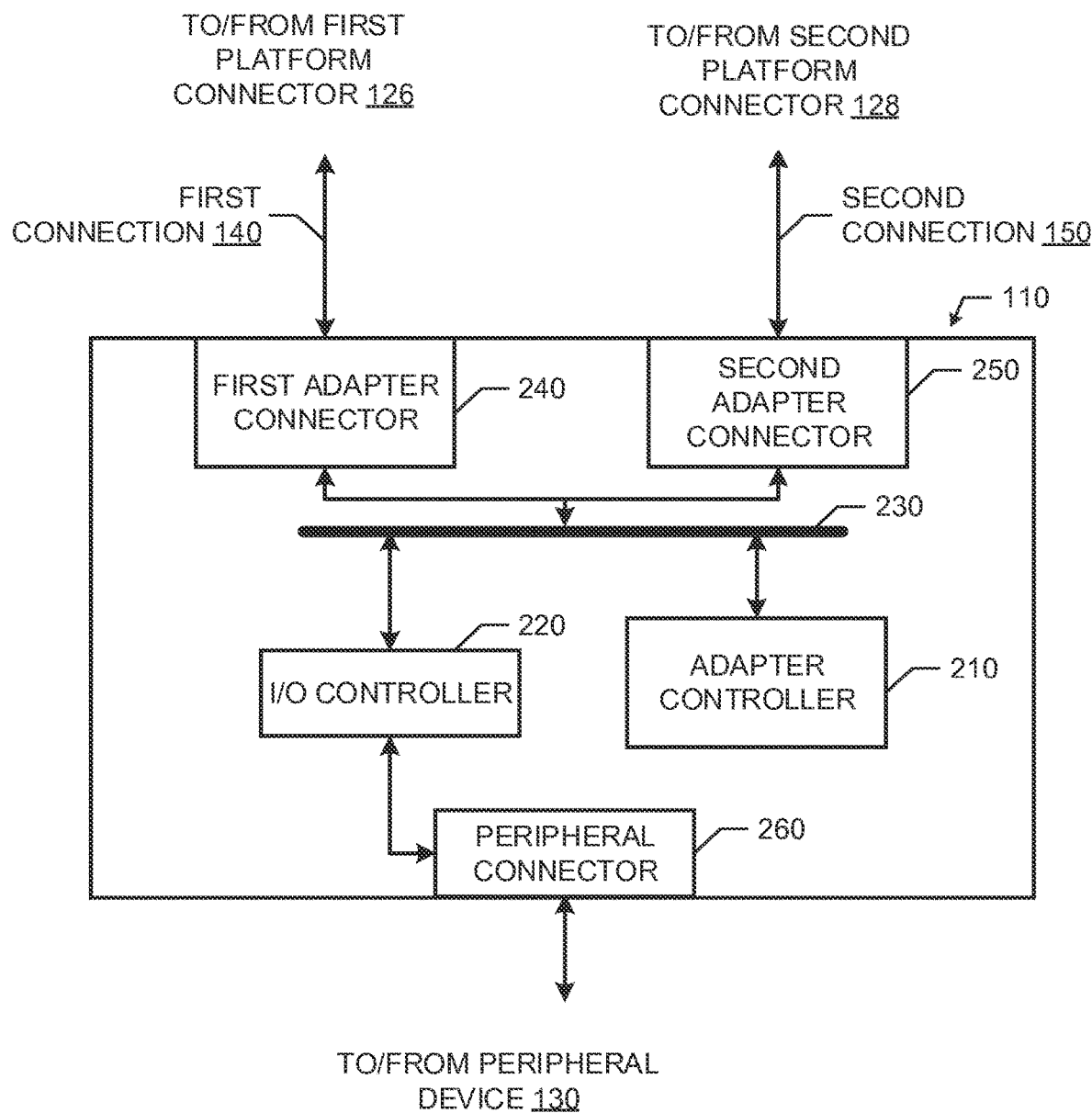
FIG. 2 is a block diagram of an example connection adapter that may be implemented by the peripheral connection system of FIG. 1.

FIG. 2 is a block diagram of an example connection adapter 110 that may be implemented by the peripheral connection system 100 of FIG. 1. The example connection adapter 110 of FIG. 2 may be used to implement the connection adapter 110 of FIG. 1. While the connection adapter 110 of FIG. 2 includes an adapter controller 210, an I/O controller 220, a communication bus 230, a first adapter connector 240, a second adapter connector 250, and a peripheral connector 260. The example adapter controller 210 may communicate (e.g., send or receive signals) to devices (e.g., the computing platform 120, the peripheral device 130, etc.) via the communication bus 230 and the I/O controller 220, the first adapter connector 240, or the second adapter connector 250. In examples disclosed herein, the adapter controller 210 of FIG. 2 may facilitate establishing a high speed connection between devices (e.g., the computing platform 120 and the peripheral device 130 of FIG. 1).

The example I/O controller 220 may be any type of I/O interface, I/O port or I/O connector. For example, the I/O controller 220 may be a Thunderbolt™ controller, a Lightning™ controller, a USB3 controller, a SATA controller, a SAS controller, etc. In some examples, the I/O controller 220 may include a switch, a repeater, or a hub. Accordingly, the I/O controller 220 facilitates connection to the connection adapter 110 of FIG. 2 for a device (e.g., the peripheral device 130) to establish a high speed connection with another device, such as the computing platform 120 of FIG. 1. In the illustrated example of FIG. 2, the I/O controller 220 connects to the peripheral connector 260. The peripheral connector 260 may be implemented by any one of or combination of USB port(s), Thunderbolt port(s), SATA connector(s), SAS connector(s), or any other type of port or connector to facilitate a high speed connection to the computing platform 120 of FIG. 1. Accordingly, in such an example, a variety of devices (e.g. SAS drives, SATA drives, USB devices, Thunderbolt devices, etc.) may establish a high speed connection with the computing platform 120 of FIG. 1 via the connection adapter 110.

The example first adapter connector 240 and a second adapter connector 250 may be connected to a device, such as the computing platform 120 of FIG. 1. For example, if the connection adapter 110 of FIG. 2 is connected to the computing platform 120 of FIG. 1, the first adapter connector 240 may connect to the first platform connector 126 to establish first connection 140 and the second adapter connector 250 may connect to the second platform connector 128 to establish the second connection 150. Accordingly, in such an example, the adapter connectors 240, 250 are compatible with the platform connectors 126, 128 in that they have a matching physical compatibility (e.g., volume, pin configuration, housing, etc.). For example, the example connectors 126, 128, 240, 250 may be connected via male and female connectors. In some examples, the first adapter connector 240 and the second adapter connector 250 may be physically located at a fixed or standard distance from one another that matches a similar fixed or standard distance between the first platform connector 126 and the second platform connector 128. The example first adapter connector 240 and second adapter connector 250 may include any suitable interface or circuitry based on the corresponding type of connector.

The example adapter controller 210 facilitates establishing a connection or communication link between devices (e.g., the computing platform 120 and the peripheral device 130 via the I/O controller 220) connected to the connection adapter 110 of FIG. 2. In examples disclosed herein, the adapter controller 210 may facilitate concatenating functionality of connectors of a device connected to the first adapter connector 240 and the second adapter connector 250. For example, the connector controller 210 may facilitate concatenating the functionality of the connectors 126, 128 of the computing platform 120 of FIG. 1 by sending information associated with the connection adapter 110, instructing the platform controller 122, or requesting the platform controller 122 to adjust the switch architecture 124 (e.g., a set of flexible I/O lanes) to make resources or bandwidth of both the connectors 126, 128 available to the connection adapter 110. Accordingly, once a suitable connection is established via the connection adapter 110, the computing platform 120 may then set up communication protocol between the computing platform 120 and the peripheral device 130 based on the resources (e.g., control devices, flexible I/O lanes, etc.) made available through connecting to the computing platform 120 via the first and second connections 140, 150.

While an example manner of implementing the connection adapter 110 of FIG. 1 is illustrated in FIG. 2, at least one of the elements, processes or devices illustrated in FIG. 2 may be combined, divided, re-arranged, omitted, eliminated or implemented in any other way. Further, the adapter controller 210, the i/o controller 220, the communication bus 230, the first adapter connector 240, the second adapter connector 250, or, more generally, the example connection adapter 110 of FIG. 2 may be implemented by hardware or any combination of hardware and executable instructions (e.g., software or firmware). Thus, for example, any the adapter controller 210, the i/o controller 220, the communication bus 230, the first adapter connector 240, the second adapter connector 250, or, more generally, the example connection adapter 110 may be implemented by at least one of an analog or digital circuit, a logic circuit, a programmable processor, an application specific integrated circuit (ASIC), a programmable logic device (PLD) or a field programmable logic device (FPLD). When reading any of the apparatus or system claims of this patent to cover a purely software or firmware implementation, at least one of the adapter controller 210, the i/o controller 220, the communication bus 230, the first adapter connector 240, or the second adapter connector 250 is/are hereby expressly defined to include a tangible computer readable storage device or storage disk such as a memory, a digital versatile disk (DVD), a compact disk (CD), a Blu-ray disk, etc. storing the executable instructions. Further still, the example connection adapter 110 of FIG. 2 may include at least one element, process, or device in addition to, or instead of, those illustrated in FIG. 2, or may include more than one of any or all of the illustrated elements, processes, and devices.

Figure 3:
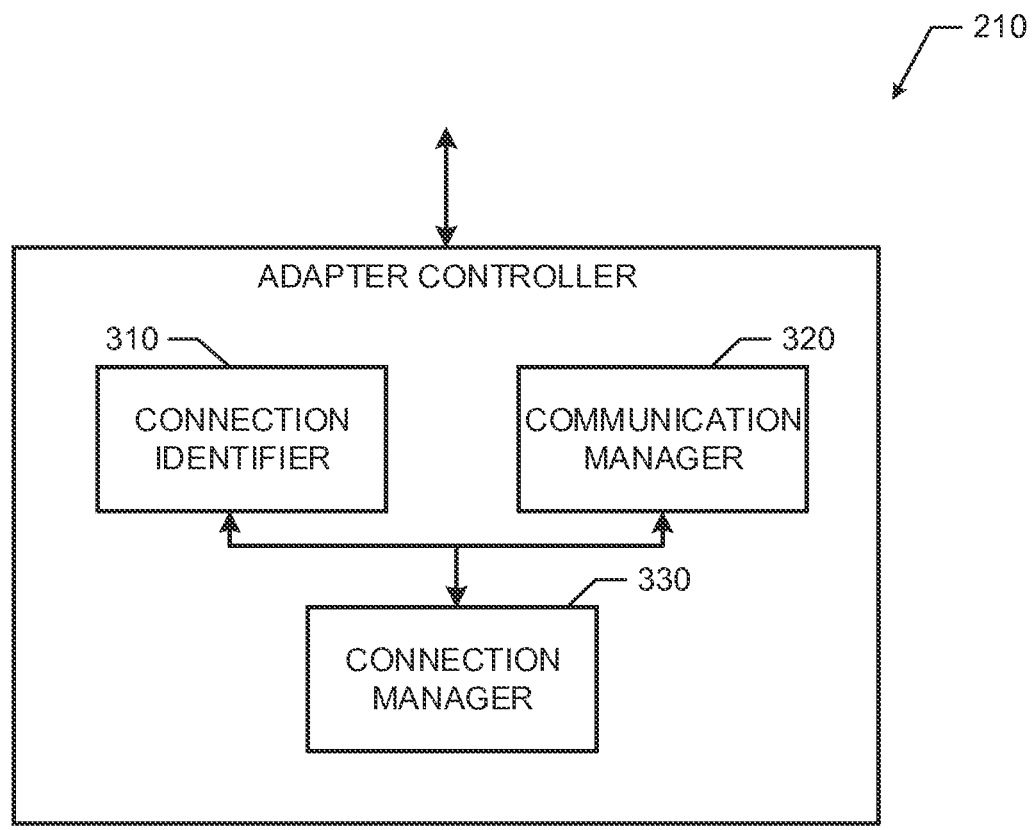
FIG. 3 is a block diagram of an example adapter controller that may be implemented by the connection adapter of FIG. 2.

FIG. 3 is a block diagram of an example adapter controller 210 that may be implemented by the connection adapter 110 of FIG. 1 or 2. The example adapter controller 210 of FIG. 3 may be used to implement the adapter controller 210 of FIG. 2. The adapter controller 210 of FIG. 3 includes a connection identifier 310, a communication manager 320, and a connection manager 330. The example connection manager 330 may communicate with the connection identifier 310 and the communication manager 320 to establish a high speed communication links between devices connected to a connection adapter (e.g., the connection adapter 110 of FIG. 1 or 2).

The example connection identifier 310 of FIG. 3 identifies or detects when a connection adapter (e.g., the connection adapter 110 of FIG. 1 or 2) is connected to a device (e.g., the computing platform 120). For example, the connection identifier 310 may monitor ports or connectors (e.g., the first adapter connector 240, the second adapter connector 250, etc.) of the connection adapter 110. In such an example, when a device is connected via a port or connector of the connection adapter 110, the connection identifier 310 may indicate to the connection manager 330 that the connection adapter is connected to a device. Accordingly, the connection manager 330 may use such information to facilitate establishing a high speed communication link with another device (e.g., the computing platform 120 or the peripheral device 130).

The example communication manager 320 of FIG. 3 sets up or facilitates establishing a connection between devices (e.g., the computing platform 120 or the peripheral device 130) connected to the connection adapter 110. Accordingly, the communication manager 320 may serve as an interface between the connection manager 330 and the computing platform 120 or the peripheral device 130 of FIG. 1. The communication manager 320 may send or receive signals, messages, requests, instructions, identification information, etc. to the computing platform 120 or the I/O controller 220.

For example, to establish a high speed communication link with the computing platform 120, the communication manager 320 may send information or instructions to the computing platform 120 to concatenate resources or functionality of the first platform connector 126 and the second platform connector 128 in accordance with the teachings of this disclosure. Such example information or instructions may include identification information, pin layout, pin configuration, pin assignments, etc.

The example connection manager 330 of FIG. 3 may facilitates establishing communication links between devices (e.g., the computing platform 120 and the peripheral device 130 of FIG. 1) connected to the connection adapter 110 of FIG. 1 or 2. For example, the connection manager 330 may determine a type of communication or a type of the peripheral device 130 (or I/O controller 220) to be connected with the computing platform 120. In some examples, the connection manager 330 may determine a particular communication protocol or communication link settings (e.g., speed, bandwidth, etc.) based on settings of the computing platform 120 or a type of connection to the computing platform 120. In some examples, the connection manager 330 of FIG. 3 establishes settings for a communication based on a type of connection identified by the connection identifier 310. For example, settings (e.g., pin assignments, pin configuration, resources needed, etc.) for a first type of connector (e.g., a thunderbolt connection) may be different for settings for a second type of connection (e.g., a SAS drive connection). Accordingly, the connection manager 330 may instruct the platform controller 122 to concatenate functionality of the first platform controller 126 and the second platform controller 128 based on the type of connection identified by the connection identifier 310. In some examples, the connection manager 330 of FIG. 3 may establish communication links between a plurality of peripheral devices and a computing platform. In such examples, the multiple peripheral devices may simultaneously be connected to the computing platform via the connection adapter 110.

While an example manner of implementing the adapter controller 210 of FIG. 2 is illustrated in FIG. 3, at least one of the elements, processes or devices illustrated in FIG. 3 may be combined, divided, re-arranged, omitted, eliminated or implemented in any other way. Further, the connection identifier 310, the communication manager 320, the connection manager 330 or, more generally, the example adapter controller 210 of FIG. 3 may be implemented by hardware or any combination of hardware and executable instructions (e.g., software or firmware). Thus, for example, any of the connection identifier 310, the communication manager 320, the connection manager 330 or, more generally, the example adapter controller 210 could be implemented by at least one of an analog or digital circuit, a logic circuit, a programmable processor, an application specific integrated circuit (ASIC), a programmable logic device (PLD) or a field programmable logic device (FPLD). When reading any of the apparatus or system claims of this patent to cover a purely software or firmware implementation, at least one of the connection identifier 310, the communication manager 320, or the connection manager 330 is/are hereby expressly defined to include a tangible computer readable storage device or storage disk such as a memory, a digital versatile disk (DVD), a compact disk (CD), a Blu-ray disk, etc. storing the executable instructions. Further still, the example adapter controller 210 of FIG. 3 may include at least one element, process, or device in addition to, or instead of, those illustrated in FIG. 3, or may include more than one of any or all of the illustrated elements, processes and devices.

Figure 4:
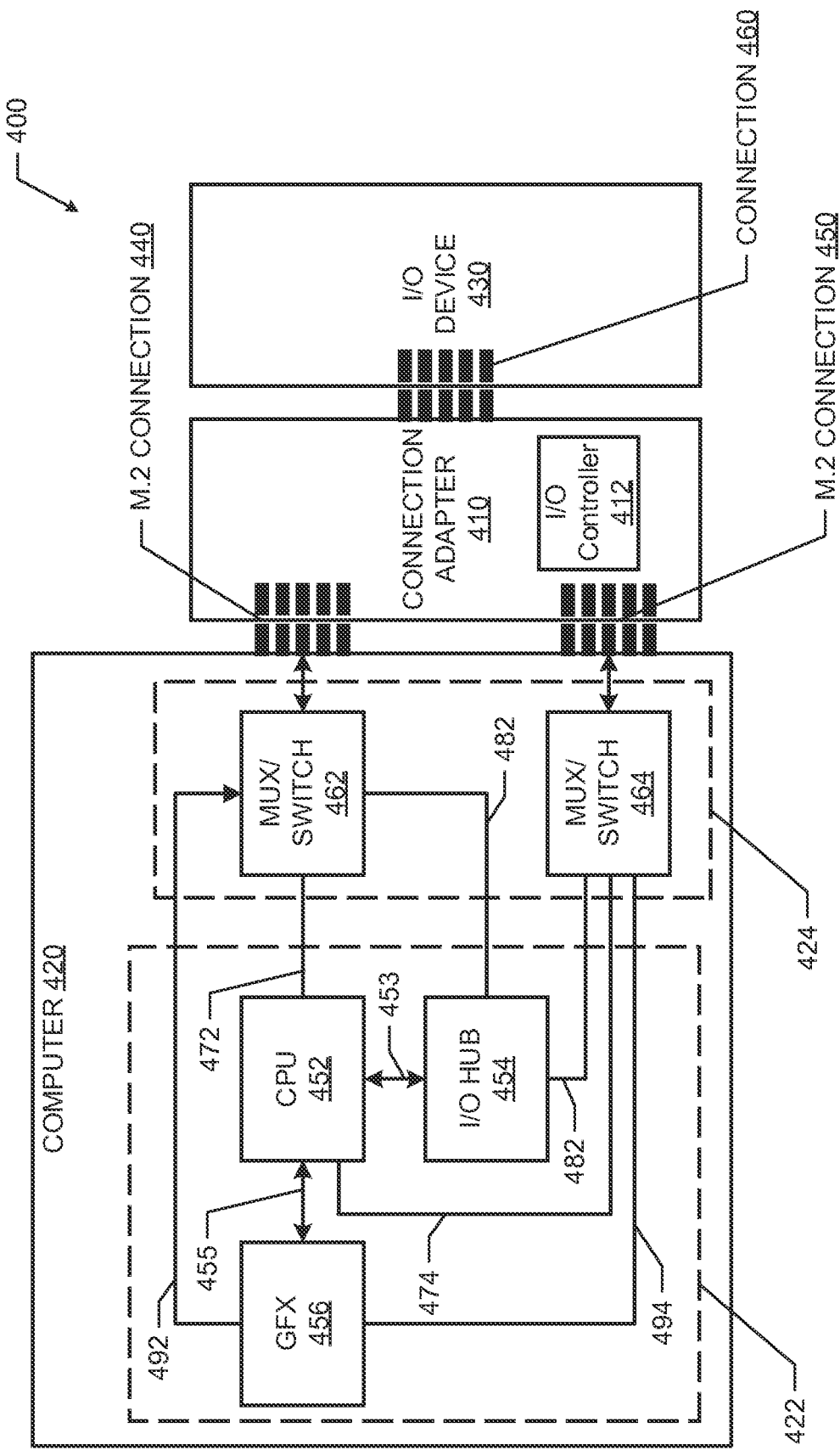
FIG. 4 illustrates an example implementation of a peripheral connection system 400 that may be implemented by the peripheral connection system 100 of FIG. 1.

FIG. 4 illustrates an example implementation of a peripheral connection system 400 that may be implemented by the peripheral connection system 100 of FIG. 1. The example peripheral connection system 400 of FIG. 4 includes an I/O device 430 connected to a computer 420 via a connection adapter 410. In the illustrated example of FIG. 4, the connection adapter 410 may be used to implement the connection adapter 110 of FIG. 1, the computer 420 may be used to implement the computing platform 120 of FIG. 1, and the I/O device 430 may be used to implement the peripheral device 130 of FIG. 1. As illustrated in FIG. 4, the connection adapter 410 is connected to the computer 420 via two M.2 connections 440, 450. The example connection adapter 410 is also connected to the I/O device 430 via any suitable connection 460 for the I/O device 430. In some examples, the connection adapter 410 and the I/O device 430 may be collocated with one another on or within a same device. The example connection adapter 410 of FIG. 4 includes an I/O controller 412.

In the illustrated example of FIG. 4, the computer 420 includes a CPU 452, an I/O Hub 454, and a graphics controller module (GFX) 456. The CPU 452, the I/O HUB 454 (e.g., a PCH), and the GFX 456 may be used to implement the platform controller 122 of FIG. 1 (as illustrated by the dotted line). The example computer 420 of FIG. 4 also includes two multiplexers (MUX) or switches 462, 464. The example multiplexers/switches 425, 426 may be used to implement the switch architecture 124 of FIG. 1 (as illustrated by the dotted line 424). The components 452, 454, 456, 462, 464 of the example computer 420 in FIG. 4 are connected with one another as illustrated via communication links or connections (e.g., PCI express connections, USB connections, display port connections, etc.).

In the illustrated example of FIG. 4, the CPU 452 and the I/O HUB 454 are connected via a communication link 453 and the CPU 452 and the GFX 456 are connected via another communication link 455. The example CPU 452 is connected to the MUX/switches 462, 464 via PCI express connections 472, 474, respectively. The I/O HUB 454 in FIG. 4 is connected to the MUX/switches 462, 464 via USB connections 482, 484, respectively. The example GFX 456 is connected to the MUX/switches 462, 464 via display port connections 492, 494, respectively.

Using the example peripheral connection system 400 of FIG. 4, the following example implementations may refer to the connections of FIG. 4 to illustrate potential configurations of the computer 420 that may be used to establish high speed connections between various I/O device(s) 430 and the computer 420 via the connection adapter 410. In examples disclosed herein, the connection adapter 410 may be able to facilitate connection to a variety of types of I/O devices 430 or a single designated type of I/O device 430.

For example, if the I/O device 430 is a Thunderbolt™ device, the example connection adapter 410 may instruct the computer 420 to establish a communication link with the Thunderbolt™ device 430 to facilitate access to the GFX 456 and the CPU 452 (because Thunderbolt™ uses Display Port and PCI). Accordingly, in such an example, in response to the instructions from the connection adapter 410 (e.g., from the I/O controller 412, which may implement a Thunderbolt™ controller), the computer 420 may instruct the MUX/Switch 462 to establish a connection between the GFX 456 and the first M.2 connection 440 via the display connection 492 and the second MUX/switch 464 to establish a connection between the CPU 452 and the second M.2 connection 450 via the PCI express connection 474. Accordingly, in such an example, the Thunderbolt™ device 430 may have high speed access (via the display port connection 492 and the PCI express connection 474) to the computer 420 via both the M.2 connections 440, 450.

As another example, if the I/O device 430 were a SAS hard drive, the example connection adapter 410 may instruct the computer 420 to establish a communication link with the SAS hard drive 430 to facilitate high speed access to the CPU 452 (because SAS uses high speed communication with a CPU). Accordingly, in such an example, in response to the instructions from the connection adapter 410 (e.g., from the I/O controller 412, which may implement a SAS controller), the computer 420 may instruct the MUX/Switch 462 to establish a first connection between the CPU and the first M.2 connection 440 via the PCI express connection 472 and the second MUX/switch 464 to establish a second connection between the CPU 452 and the second M.2 connection 450 via the PCI express connection 474. Accordingly, in such an example, the SAS hard drive 430 may have high speed access (via both PCI express connections 472, 474) to the computer 420 via both the M.2 connections 440, 450. It is noted, that an SAS drive 430 connected to the CPU via only one of the first PCI express link 472 or the second PCI express link 474 (i.e., via one of the first M.2 connection 440 or second M.2 connection 450) would not have as great of a high speed connection with the computer 420 as the above described example.

In yet another example, if the I/O device 430 were a Wi-Di device, the example connection adapter 410 may instruct the computer 420 to establish a communication link with the Wi-Di device 430 to facilitate access to the CPU 452, the I/O HUB 454, and the GFX 456 (because the Wi-Di uses Display Port, PCI Express, and USB). Accordingly, in such an example, in response to the instructions from the connection adapter 410, the computer 420 may instruct the MUX/switch 462 to establish a connection between the CPU 452 and the first M.2 connection 440 via the PCI express connection 472 and a connection between the I/O HUB 454 and the first M.2 connection 440 via the USB connection 482. Also, the computer 420 may instruct the MUX/switch 464 to establish a connection between the GFX 456 and the second M.2 connection 450 via the display port connection 494. In this example, the I/O controller 412 of FIG. 4 may convert communication protocol into wireless communication protocol for the Wi-Di device. Accordingly, in such an example, the Wi-Di device 430 may have high speed access (via the PCI express connection 472, the USB connection 482, and the display port connection 494) to the computer via both the M.2 connections 440, 450.

Accordingly, the illustrated example of FIG. 4 demonstrates the flexibility made available to the I/O devices 430 using the connection adapter 410. Thus, the computer 420 may concatenate resources (e.g., flexible I/O lanes, the components 452, 454, 456, 462, 464, etc.) connected to the first and second connector by establishing the above mentioned communication links between the components 452, 454, 456, 462, 464 of the computer 420 and the first and second connections 440, 450. Accordingly, using the connection adapter 420, a peripheral device (e.g., Thunderbolt™ devices, SAS devices, Wi-Di devices, etc.) may establish high speed connections with a computer using a plurality of connectors (e.g., two M.2 connectors). It is noted that although FIG. 4 illustrates the use of two M.2 connectors, other connectors or types of connectors may be used. For example, USB connection(s), Display port connection(s), PCI connection(s), etc. may be used in addition or instead of the M.2 connections 440, 450 of FIG. 4.

Figure 5:
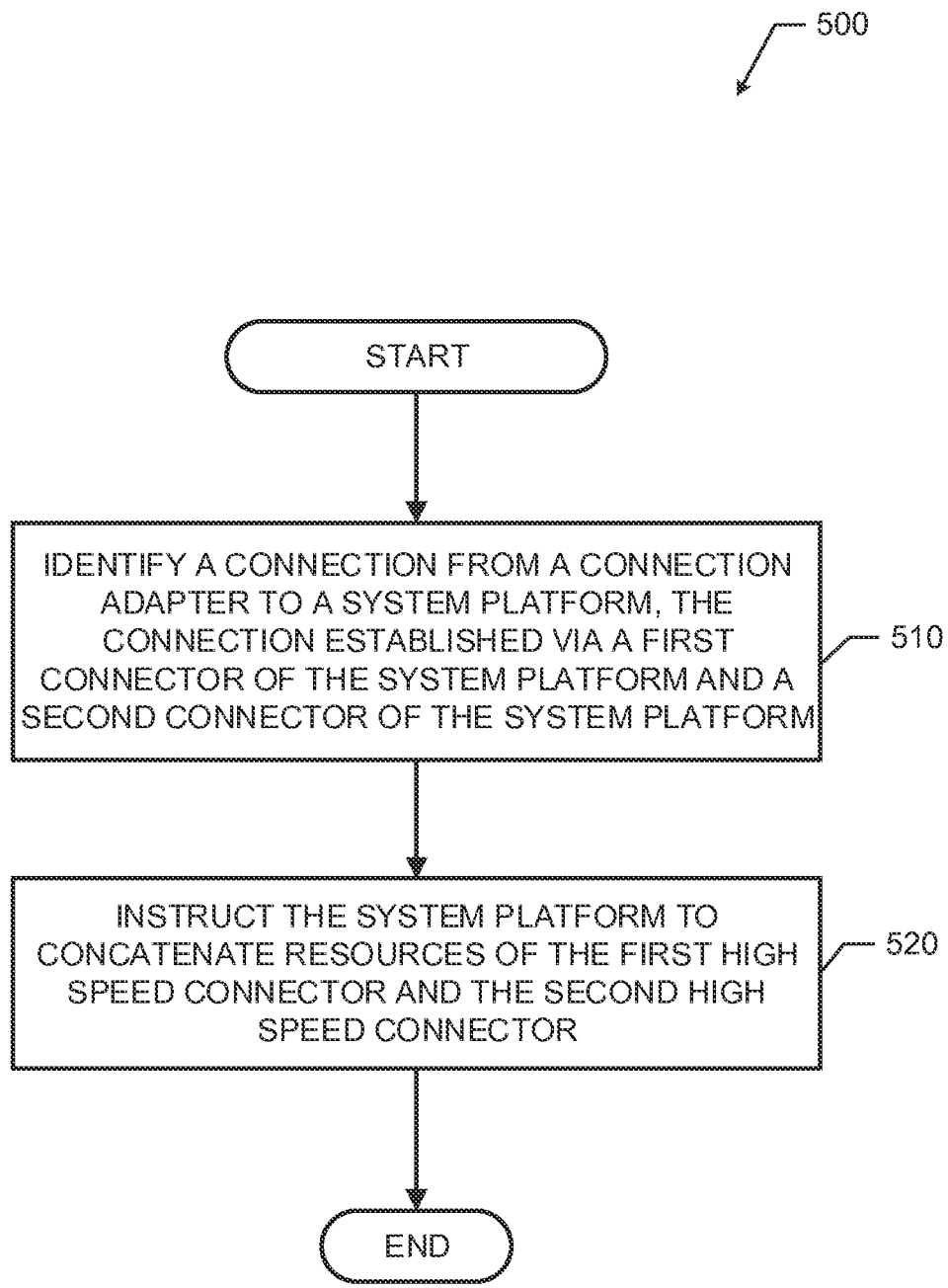
FIG. 5 is a flowchart representative of example machine readable instructions that may be executed to implement the connection adapter of FIG. 2 or 3.

A flowchart representative of example machine readable instructions for implementing the connection adapter 110 or the adapter controller 210 of FIGS. 2 and 3, respectively, is shown in FIG. 5. In this example, the machine readable instructions comprise a program/process for execution by a processor such as the processor 712 shown in the example processor platform 700 discussed below in connection with FIG. 7. The program/process may be embodied in executable instructions (e.g., software) stored on a tangible computer readable storage medium such as a CD-ROM, a floppy disk, a hard drive, a digital versatile disk (DVD), a Blu-ray disk, or a memory associated with the processor 712, but the entire program/process or parts thereof could alternatively be executed by a device other than the processor 712 or embodied in firmware or dedicated hardware. Further, although the example program is described with reference to the flowchart illustrated in FIG. 5, many other methods of implementing the example connection adapter 110 or the example adapter controller 210 may alternatively be used. For example, the order of execution of the blocks may be changed, or some of the blocks described may be changed, eliminated, or combined.

The process 500 of FIG. 5 begins with an initiation of the connection adapter 110 (e.g., upon startup of the connection adapter 110, upon instructions from a user, upon startup of a device connected to the connection adapter 110 (e.g., the computing platform 120 or the peripheral device 130), upon being connected to another device, etc.). At block 510 of the example process 500 of FIG. 5, the connection identifier 310 identifies a connection from the connection adapter 110 to a system platform (e.g., the computing platform 120 of FIG. 1) via a first connector (e.g., the first platform connector 126) and a second connector (e.g., the second platform connector 128). At blocks 510 an identification may be made based on a received signal (e.g., a beacon, a communication request, etc.) identified or detected upon connection between the connection adapter 110 and the computing platform 120.

The example communication manager 320, at block 520 of FIG. 5, instructs the system platform (e.g., the computing platform 120) to concatenate resources of the first high speed connector (e.g., flexible I/O lanes, switches, multiplexers, controllers, etc. connected to the first high speed connector) and resources of the second high speed connector (e.g., flexible I/O lanes, switches, multiplexers, controllers, etc. connected to the first high speed connector). Accordingly, at block 530, the concatenated resources provide a high speed connection to a peripheral device (e.g., the peripheral device 130) via the connection adapter 110. After block 520, the example process 500 of FIG. 5 ends.

Figure 6:
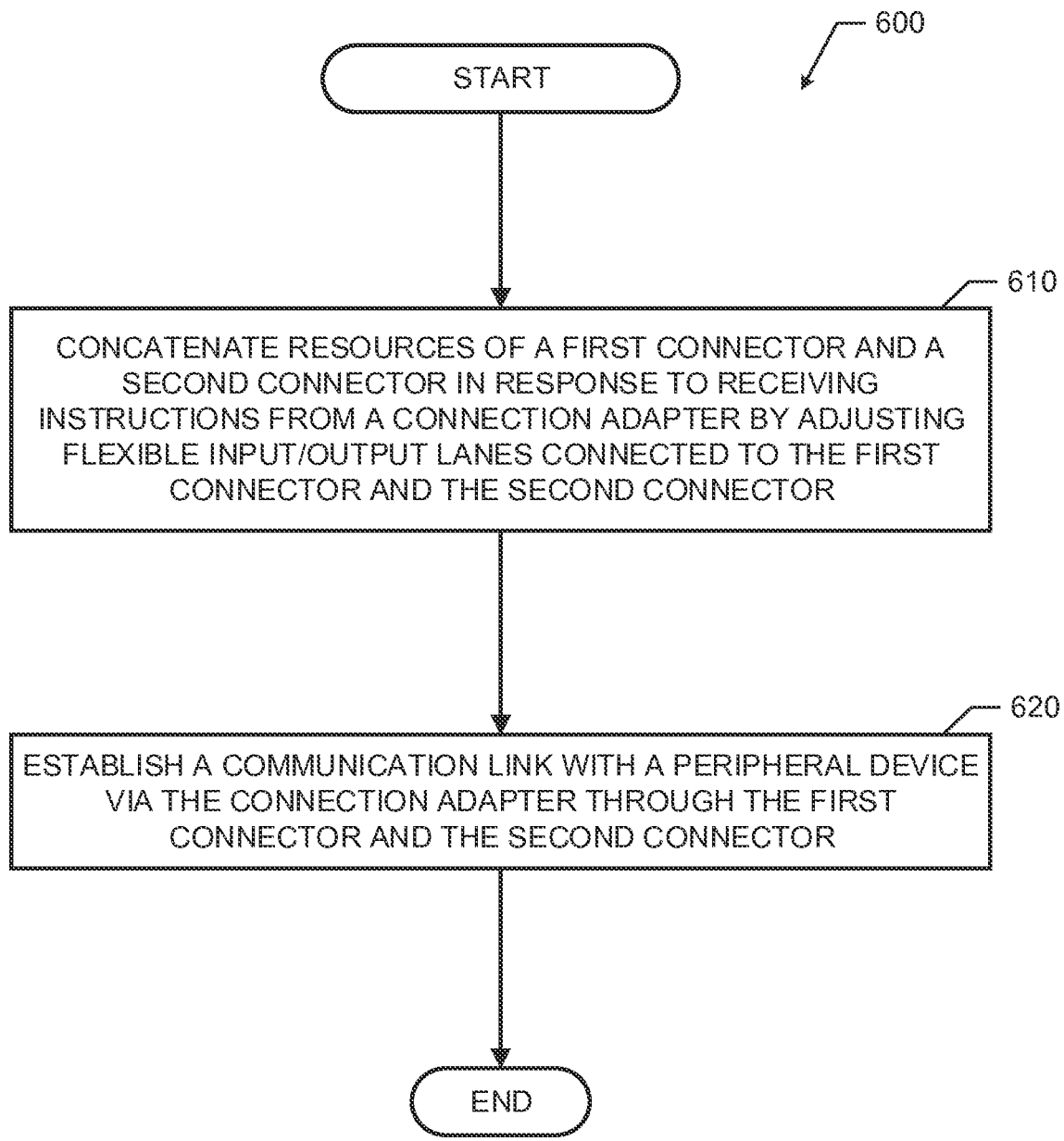
FIG. 6 is a flowchart representative of an example machine readable instructions that may be executed by the computing platform of FIG. 1 to implement the platform controller 122 of FIG. 1.

A flowchart representative of example machine readable instructions for implementing the platform controller 122 of FIG. 1 is shown in FIG. 6. In this example, the machine readable instructions comprise a program/process for execution by a processor such as the processor 712 shown in the example processor platform 700 discussed below in connection with FIG. 7. The program/process may be embodied in executable instructions (e.g., software) stored on a tangible computer readable storage medium such as a CD-ROM, a floppy disk, a hard drive, a digital versatile disk (DVD), a Blu-ray disk, or a memory associated with the processor 712, but the entire program/process or parts thereof could alternatively be executed by a device other than the processor 712 or embodied in firmware or dedicated hardware. Further, although the example program is described with reference to the flowchart illustrated in FIG. 6, many other methods of implementing the example A1 may alternatively be used. For example, the order of execution of the blocks may be changed, or some of the blocks described may be changed, eliminated, or combined.

The process 600 of FIG. 6 begins with an initiation of the platform controller 122 (e.g., upon startup of the computing platform 120, upon instructions from a user or the connection adapter 110, upon being connected to another device (e.g., the connection adapter 110), etc.). At block 610 of FIG. 6, the platform controller 122 concatenates resources of a first connector and a second connector in response to receiving instructions from a connection adapter by adjusting flexible I/O lanes connected to the first connector and the second connector. In some examples, the adjusted flexible I/O lanes may include or comprise multiplexers, switches, etc. At block 620, the platform controller 122 establishes a communication link with a peripheral device via the connection adapter through the first connector and the second connector. In some examples, at block 620, the communication link is established with the peripheral device 130 in response to receiving instructions or in response to the connection adapter 110 setting up the communication link. After block 620, the example process 600 of FIG. 6 ends.

As mentioned above, the example processes of FIG. 5 or 6 may be implemented using coded instructions (e.g., computer or machine readable instructions) stored on a tangible computer readable storage medium such as a hard disk drive, a flash memory, a read-only memory (ROM), a compact disk (CD), a digital versatile disk (DVD), a cache, a random-access memory (RAM) or any other storage device or storage disk in which information is stored for any duration (e.g., for extended time periods, permanently, for brief instances, for temporarily buffering, or for caching of the information). As used herein, the term tangible computer readable storage medium is expressly defined to include any type of computer readable storage device or storage disk and to exclude propagating signals and to exclude transmission media. As used herein, "tangible computer readable storage medium" and "tangible machine readable storage medium" are used interchangeably. Additionally or alternatively, the example processes of FIG. 5 or 6 may be implemented using coded instructions (e.g., computer or machine readable instructions) stored on a non-transitory computer or machine readable medium such as a hard disk drive, a flash memory, a read-only memory, a compact disk, a digital versatile disk, a cache, a random-access memory or any other storage device or storage disk in which information is stored for any duration (e.g., for extended time periods, permanently, for brief instances, for temporarily buffering, or for caching of the information). As used herein, the term non-transitory computer readable medium is expressly defined to include any type of computer readable storage device or storage disk and to exclude propagating signals and to exclude transmission media.

As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated (e.g., when accompanied by the term "either"), considered an "exclusive or."

Figure 7:
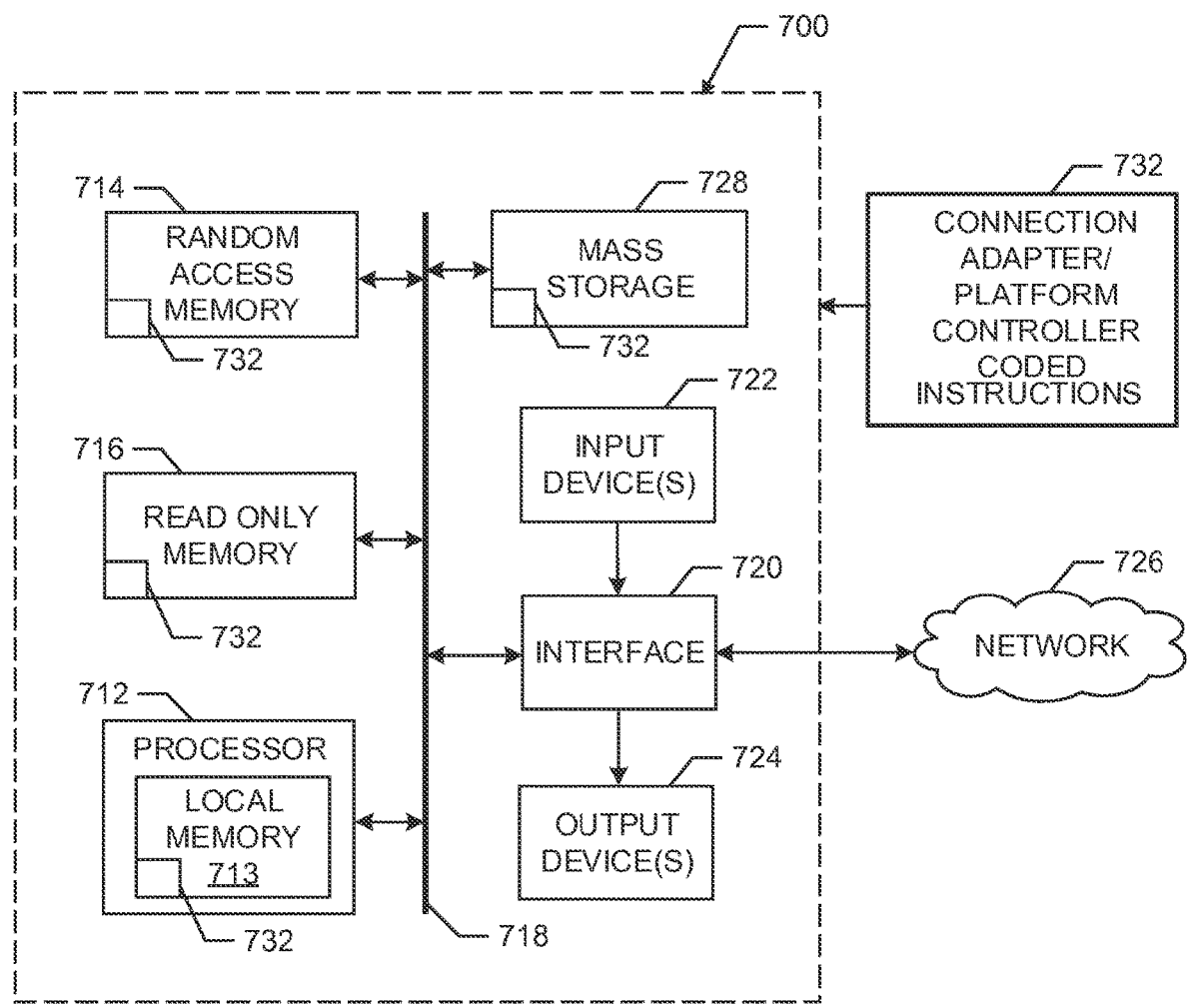
FIG. 7 is a block diagram of an example processor platform capable of executing the instructions of FIG. 5 or 6 to implement the connection adapter of FIG. 2 or 3 or to implement the computing platform of FIG. 1, respectively.

FIG. 7 is a block diagram of an example processor platform 700 capable of executing the instructions of FIG. 5 to implement the connection adapter 110 of FIG. 2 or 3. In some examples, the example processor platform 700 may be used to implement the computing platform 120 of FIG. 1 and may be capable of executing the instructions of FIG. 6 to implement the platform controller 122. The example processor platform 700 may be or may be included in any type of apparatus, such as a server, a personal computer, a mobile device (e.g., a cell phone, a smart phone, a tablet, etc.), a personal digital assistant (PDA), an Internet appliance, the connection adapter 110 or any other type of computing device.

The processor platform 700 of the illustrated example of FIG. 7 includes a processor 712. The processor 712 of the illustrated example is hardware. For example, the processor 712 can be implemented by at least one integrated circuit, logic circuit, microprocessor or controller from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) or any other type of random access memory device. The non-volatile memory 716 may be implemented by flash memory or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), or a peripheral component interconnect (PCI) express interface.

In the illustrated example, at least one input device 722 is connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint or a voice recognition system.

At least one output device 724 is also connected to the interface circuit 720 of the illustrated example. The output device(s) 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer or speakers). The interface circuit 720 of the illustrated example, thus, may include a graphics driver card, a graphics driver chip or a graphics driver processor.

The interface circuit 720 of the illustrated example also includes a communication device such as a transmitter, a receiver, a transceiver, a modem or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.). The example communication manager 320 of FIG. 3 may be implemented by the interface circuit 720 of FIG. 7.

The processor platform 700 of the illustrated example also includes at least one mass storage device 728 for storing executable instructions (e.g., software) or data. Examples of such mass storage device(s) 728 include floppy disk drives, hard drive disks, compact disk drives, Blu-ray disk drives, RAID systems, and digital versatile disk (DVD) drives.

The coded instructions 732 of FIG. 5 or 6 may be stored in the mass storage device 728, in the local memory 713 in the volatile memory 714, in the non-volatile memory 716, or on a removable tangible computer readable storage medium such as a CD or DVD.

From the foregoing, it will be appreciated that the above disclosed methods, apparatus and articles of manufacture establish a high speed connection between a computing platform and a peripheral device by concatenating functionalities of multiple connectors of the computing platform. Accordingly, greater flexibility may be offered to peripheral devices to connect to computing platforms in accordance with the examples disclosed herein. For example, if a peripheral device was not compatible with a particular computing platform because the computing platform did not have proper available connections for the peripheral devices, the examples involved herein may allow for compatible connectivity with high speed capabilities. Furthermore, a variety of different types of peripheral devices may further be connected to the computing platform using the examples disclosed herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising a separate hardware connection adapter to provide a high speed data connection between a computing system and a peripheral device, the adapter further comprising:
    a first connector to connect with a first interface port of the system;
    a second connector to connect with a second interface port of the system;
    a third connector to connect with a peripheral device for the computing system; and
    an adapter controller to:
        combine functionality of the first connector and the second connector when the adapter is communicatively coupled to the system via the first connector and the second connector; and
        establish a high speed connection between the system and the single peripheral device via the combined functionality of the first connector and the second connector.

2. The apparatus as defined in claim 1, wherein the high speed connection is further established between the system and a peripheral device connected to the peripheral connector of the apparatus.

3. The apparatus as defined in claim 2, wherein the high speed connection is further established between the system and the peripheral device via at least one of an I/O controller, a repeater, a switch, or a hub.

4. The apparatus as defined in claim 2, wherein the adapter controller establishes the high speed connection between the system and the apparatus based on a type of a peripheral device or a type of I/O controller between the apparatus and the peripheral device.

5. The apparatus as defined in claim 1, wherein the adapter controller combines the functionality of the first connector and the second connector by instructing a controller of the system to allocate resources of the system to the first connector and the second connector to establish the high speed connection.

6. The apparatus as defined in claim 1, wherein the adapter controller combines the functionality of the first connector the and second connector by instructing the system to:
- establish a connection between the first connector and one of:
  - a central processing unit of the system via a first peripheral component interconnect connection,
  - a graphics controller of the system via a first display port connection, or
  - a platform controller hub via a first universal serial bus connection; and
- establish a connection between the second connector and one of:
  - the central processing unit of the system via a second peripheral component interconnect connection,
  - the graphics controller of the system via a second display port connection, or
  - the platform controller hub via a second universal serial bus connection.

7. The apparatus as defined in claim 1, wherein the first connector and the second connector are at a fixed physical configuration that matches corresponding separate connectors of the system to facilitate access to the system via the first connector and the second connector.

8. The apparatus as defined in claim 1, wherein the high speed connection provides a higher speed connection than if the peripheral device were connected to the system platform via one of either the first connector or the second connector.

9. A method comprising:
- with a separate hardware connection adapter to provide a high speed data connection between a computing system platform and a peripheral device, identifying a connection from the adapter to the system platform, the connection established by plugging a first connector of the adapter into a first port of the system platform and a second connector of the adapter into a second port of the system platform; and
- instructing, via a processor of the connection adapter, the system platform to concatenate resources of the first connector and resources of the second connector such that the concatenated resources provide a high speed connection to a peripheral device via the connection adapter.

10. The method as defined in claim 9, further comprising:
- identifying a type of the peripheral device or a type of an I/O controller for the peripheral device; and
- instructing the system platform to concatenate the resources of the first connector and the resources of the second connector based on the type of the peripheral device or the type of the I/O controller, respectively.

11. The method as defined in claim 9, further comprising: establishing the high speed connection between the system platform and the peripheral device via an I/O controller for the peripheral device.

12. The method as defined in claim 11, wherein the I/O controller comprises at least one of a repeater, a switch, or a hub.

13. A non-transitory computer readable storage medium comprising executable instructions that, when executed, cause a machine to at least:
- concatenate resources of a first connector and a second connector of a separate hardware connection adapter that are plugged respectively into a first port and a second port of the machine in response to receiving instructions from the connection adapter, the concatenating of resources comprising adjusting flexible input/output lanes connected to the first connector and the second connector; and
- establish a high speed communication link using the concatenated resources with a peripheral device via the adapter through the first connector and the second connector.

14. The non-transitory computer readable storage medium of claim 13, wherein the executable instructions further cause the machine to:
- concatenate the resources of the first connector and the second connector by establishing communication links between components of the machine and the first and second connectors as indicated in the instructions from the connection adapter.

15. The non-transitory computer readable storage medium of claim 13, wherein the executable instructions further cause the machine to:
- receive communication settings from the connection adapter for establishing the communication link.

16. The apparatus as defined in claim 1, further comprising a bus within the connection adapter to which the first connector, second connector, adapter controller and peripheral connector are all connected.

17. The apparatus as defined in claim 1, wherein the adapter controller further comprises a connection identifier to identify when the apparatus is connected to the system.

18. The apparatus as defined in claim 17, wherein the adapter controller further comprises a connection manager to be notified by the connection identifier when the apparatus is connected to a system, the connection manager to set up communication between the system, using both the first and second connectors, and a peripheral connected to the peripheral connector.

19. The apparatus as defined in claim 18, wherein the adapter controller further comprises a communication manager to serve as an interface between the connection manager and the system to which the apparatus is connected via the first and second connectors.

20. The apparatus as defined in claim 1, wherein both the first and second connectors are separate M.2 connectors.

* * * * *